United States Patent [19]
Asit et al.

[11] Patent Number: 5,530,557
[45] Date of Patent: Jun. 25, 1996

[54] ONLINE PLACEMENT OF VIDEO FILES DETERMINED BY A FUNCTION OF THE BANDWIDTH TO SPACE RATIO OF EACH OF THE STORAGE DEVICES IN A SERVER ENVIRONMENT

[75] Inventors: Dan Asit, West Harrison; Dinkar Sitaram, Yorktown Heights, both of N.Y.

[73] Assignee: International Business Machines Corporation, Armonk, N.Y.

[21] Appl. No.: 304,344

[22] Filed: Sep. 12, 1994

[51] Int. Cl.⁶ .............................. H04N 5/76; H04N 7/10; H04N 5/781
[52] U.S. Cl. ................................. 358/342; 348/7
[58] Field of Search ..................... 395/200, 115; 348/7; 358/335, 342, 310; H04N 5/76, 5/781, 5/765, 7/10

[56] References Cited

U.S. PATENT DOCUMENTS

| 5,142,667 | 8/1992 | Dimperio et al. | 395/115 |
| 5,341,474 | 8/1994 | Gelman et al. | 395/200 |
| 5,442,390 | 8/1995 | Hooper et al. | 348/7 |

OTHER PUBLICATIONS

The Impact of Digital Audio & Video on High Speed Storage IEEE 1051-9173/94 p. 87

*Primary Examiner*—Tommy P. Chin
*Assistant Examiner*—David R. Vincent
*Attorney, Agent, or Firm*—Richard M. Ludwin

[57] ABSTRACT

A placement system and method wherein the placement of programs such as movies, audio programs, audio-visual programs and similar types of data, is determined as a function of the bandwidth-space ratio (BSR) of each disk in the system. The BSR of a disk is defined as the bandwidth of the disk divided by the space. The BSR of the programs on the disk is the total expected demand for the programs divided by the space required to store the programs. In a preferred embodiment, a Video Placement Manager (a software task operating under a server's main control program) places the programs on the disks so as to best match the BSR of movies stored on the disk and the BSR of the disk, thus minimizing the waste of both disk bandwidth and disk space.

10 Claims, 11 Drawing Sheets

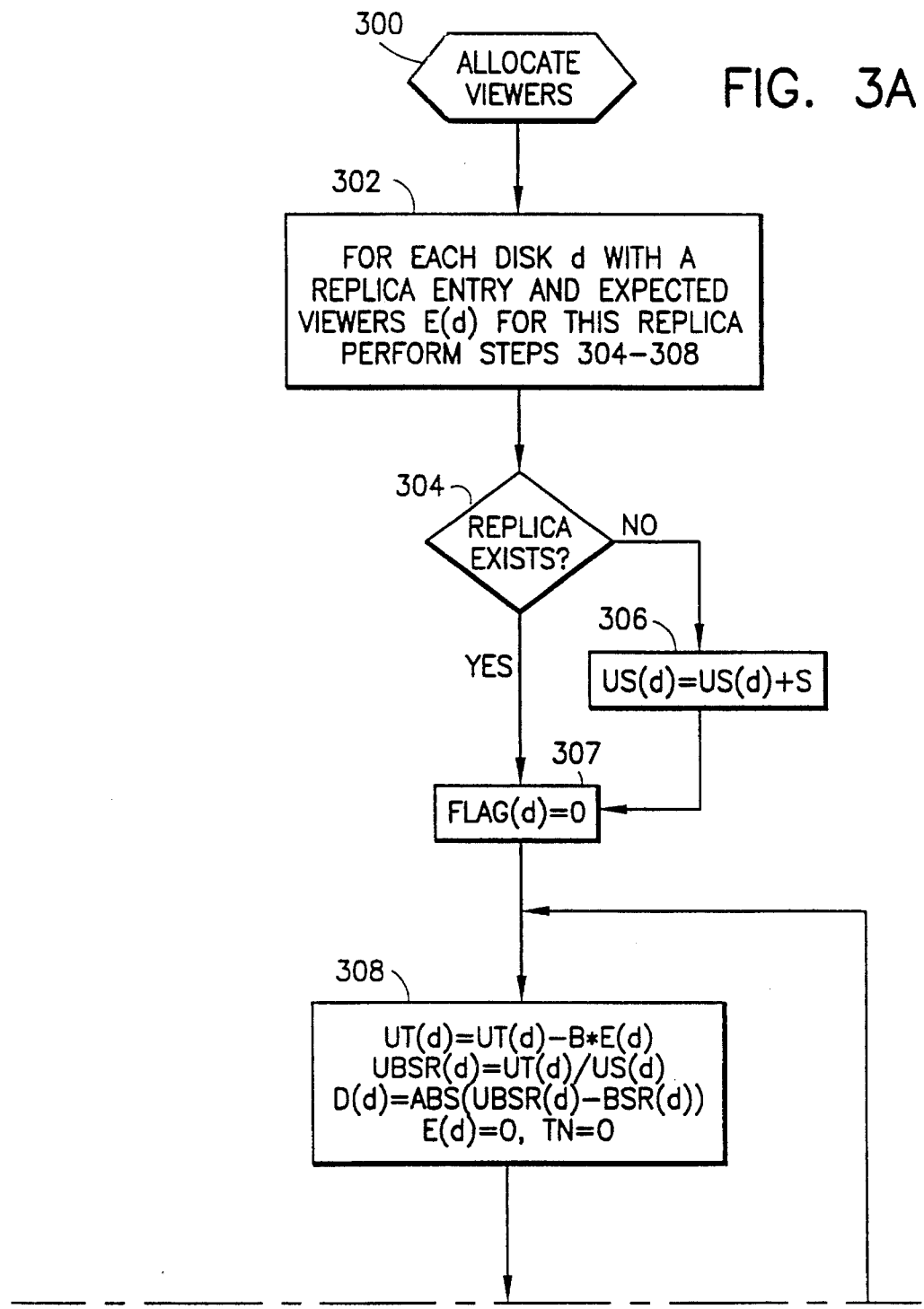

ONLINE PLACEMENT OF VIDEO FILES DETERMINED BY A FUNCTION OF THE BANDWIDTH TO SPACE RATIO OF EACH OF THE STORAGE DEVICES IN A SERVER ENVIRONMENT

BACKGROUND OF THE INVENTION

1. Field of the Invention

This invention relates to the field of Video-On-Demand (VOD) and other On-Demand program systems.

2. Related Art

In a video-on-demand server with multiple disks and video files (e.g. movies), it is necessary to determine which video files are to be placed on which disks. Each disk is limited both by the amount of bandwidth and space, i.e., the number of video data streams that can be played simultaneously and the number of video files that can be accommodated. The expected demands for different videos are non-uniform. The expected demand for some videos may be low enough that they can be satisfied from one disk or striped set of disks. On the other hand, the expected demand for some videos may be so high that multiple replicas are needed.

The number of replicas required for a video file also depends on the placement of the other videos in the system. Even if the expected demand for a video is low enough that it can be satisfied by a single disk group, there may be no empty disk group at the current time. Consequently, it may be necessary to create multiple replicas of the video on two different disk groups. The video placement also depends on the characteristics of the disk. It may be advantageous to place videos with low demand on slow disks and videos with high demand on fast disks. Determining the proper placement is thus an important task.

SUMMARY OF THE INVENTION

In accordance with the present invention, the placement of programs (which as used herein refers to movies, audio programs, audio-visual programs and similar types of data) is determined as a function of the bandwidth-space ratio (BSR) of each disk in the system. The BSR of a disk is defined as the bandwidth of the disk divided by the space. The BSR of the programs on the disk is the total expected demand for the programs divided by the space required to store the programs. As used herein, the term "disk" refers to a logical disk which may consist of a physical disk or a number of physical disks on which program files are striped.

In a preferred embodiment, a Video Placement Manager (a software task operating under a server's main control program) places the programs on the disks so as to best match the BSR of movies stored on the disk and the BSR of the disk, thus minimizing the waste of both disk bandwidth and disk space.

BRIEF DESCRIPTION OF THE DRAWING

FIGS. 3A–3D are a flow chart of the processing performed by the VPM after the VPM has selected the disks on which the replicas will be placed; and, FIG. 4 is a block diagram of a video-on-demand system embodying the features of the present invention.

DETAILED DESCRIPTION OF THE PREFERRED EMBODIMENT

The present invention is implemented in the context of a video-on-demand (VOD) system. As used herein, video's refer to any type of audio or audio-visual presentation and the term "disk" refers to a logical disk which may consist of a physical disk or a number of physical disks on which program files are striped.

Figure 4:
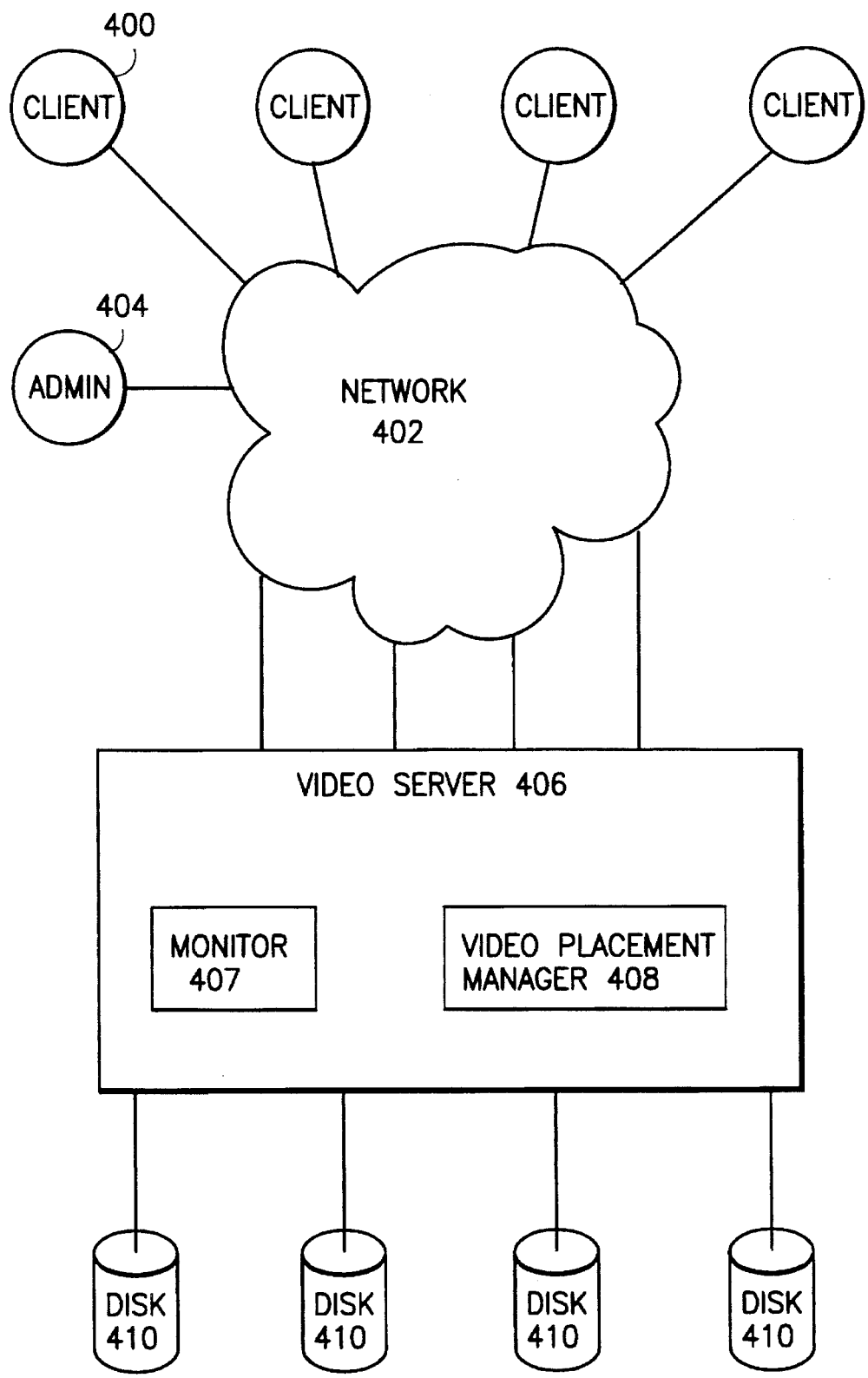

FIG. 4 is a block diagram of a video-on-demand system embodying the features of the present invention. It is assumed that clients 400 make requests from a video server 406 via a communication network 402 (such as a fiber optic network). The video server 406 can be of a conventional central server type (embodied on a mainframe such as an IBM ES/9000 system or workstation such as an IBM RISC SYSTEM/6000 system), modified in accordance with the principles of the present invention. Those of skill in the art will recognize that many of the conventional components of such a server are not shown for purposes of clarity.

The video server 406 services the requests by retrieving the videos from disks 410 and transmitting them to the clients by way of the network. Statistics on the usage of various videos are gathered by a monitor task 407 which is also responsible for projecting the future demand for videos.

Future demand can be predicted in a number of ways. For example, the monitor task can store request data, observe past trends (increasing or decreasing for a given video) and predict the future demand as a function of these trends. Another example of a prediction method is to set the predicted demand for a given video at a particular time to the actual demand for that video at the same time on the previous day. Further, the monitor program could use predictions made and input by a human system administrator.

The video server 406 contains a video placement manager (VPM) 408 that is responsible for deciding which disks to place each video on and how many copies of each video are needed. The video placement manager is invoked by the system administrator 404 or the monitor task 407 whenever the anticipated demand for a video changes or a new video is to be added. The video placement manager then changes, as necessary, the placement and the number of replicas of the various videos so as to satisfy the new demand. In order to make intelligent decisions about the placement and number of replicas for each video, the VPM keeps track of the anticipated demand for each video and replica.

In accordance with an embodiment of the present invention, the video placement manager 408 uses the bandwidth-space ratio (BSR) of both the videos and the disks to determine where to place videos on disks. The BSR of a disk is defined as the bandwidth of the disk divided by the space. In a video server environment, the bandwidth of a disk is the maximum rate at which the disk can provide continuous (uninterrupted) streams of data (this will typically be lower than the actual disk capacity). The BSR of the videos on the disk is the total expected demand for the videos divided by the space required to store the videos. If the BSR of the videos currently on a disk is less than that of the disk, then disk bandwidth will be wasted, because if additional videos with the same BSR are stored on the disk, the disk will run out of space before the bandwidth is exhausted. On the other hand, if the BSR of the videos on the disk is greater than that of the disk, then disk space will be wasted. If the BSR of the videos on the disk and the BSR of the disk are the same, then neither bandwidth nor space will be wasted.

Figure 1:
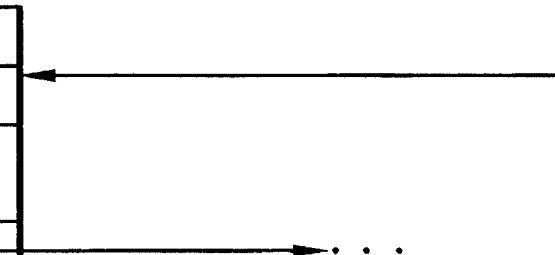
FIG. 1 is a diagram of the data structures maintained by the video placement manager (VPM) shown in FIG. 4.
Figure 2A:
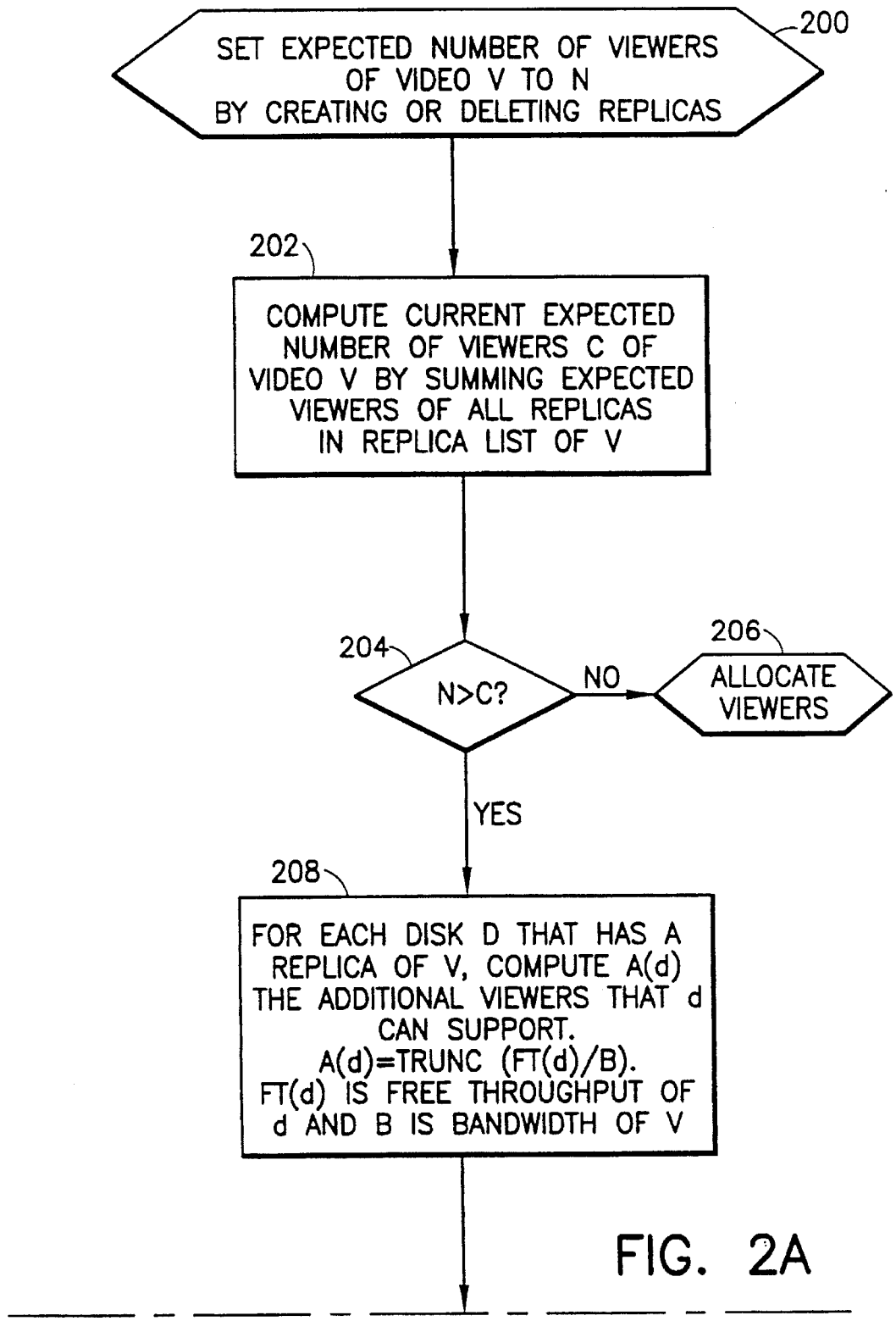
FIGS. 2A–2E are a flowchart of the processing of a command by the VPM, to configure the system to set the expected number of viewers for a video (V) to a new number of viewers (N)
Figure 2B:
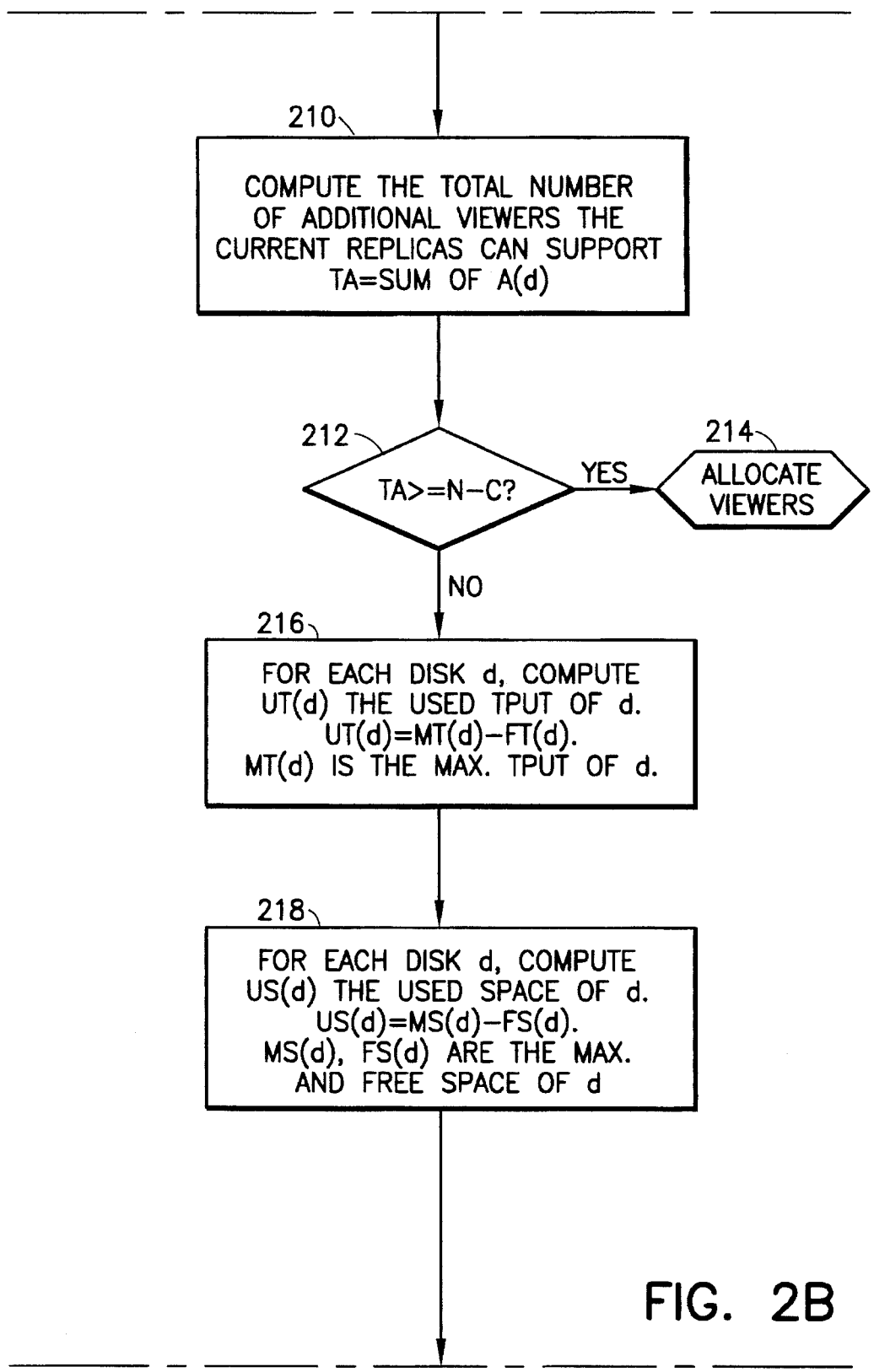
Figure 2C:
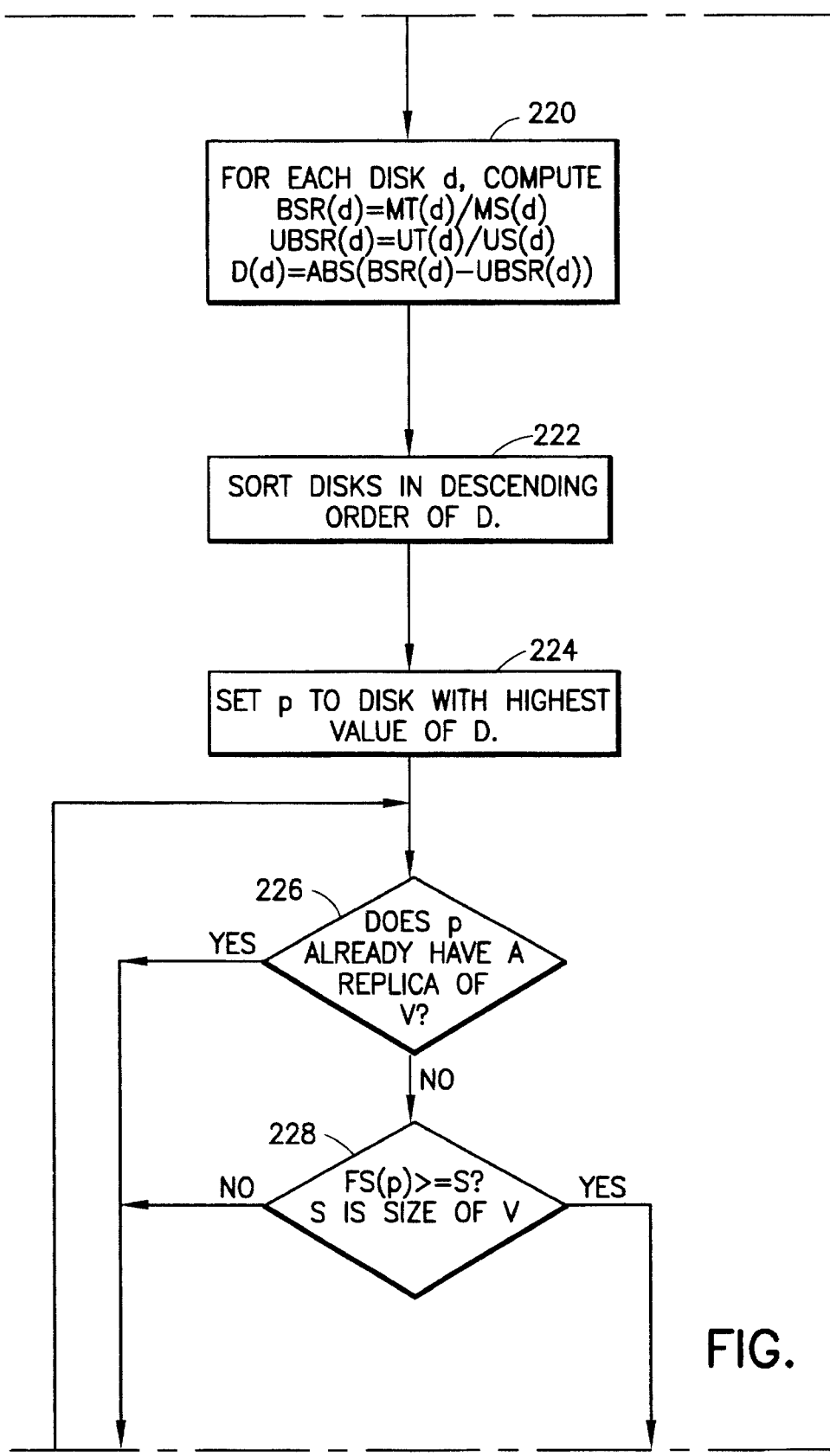
Figure 2D:
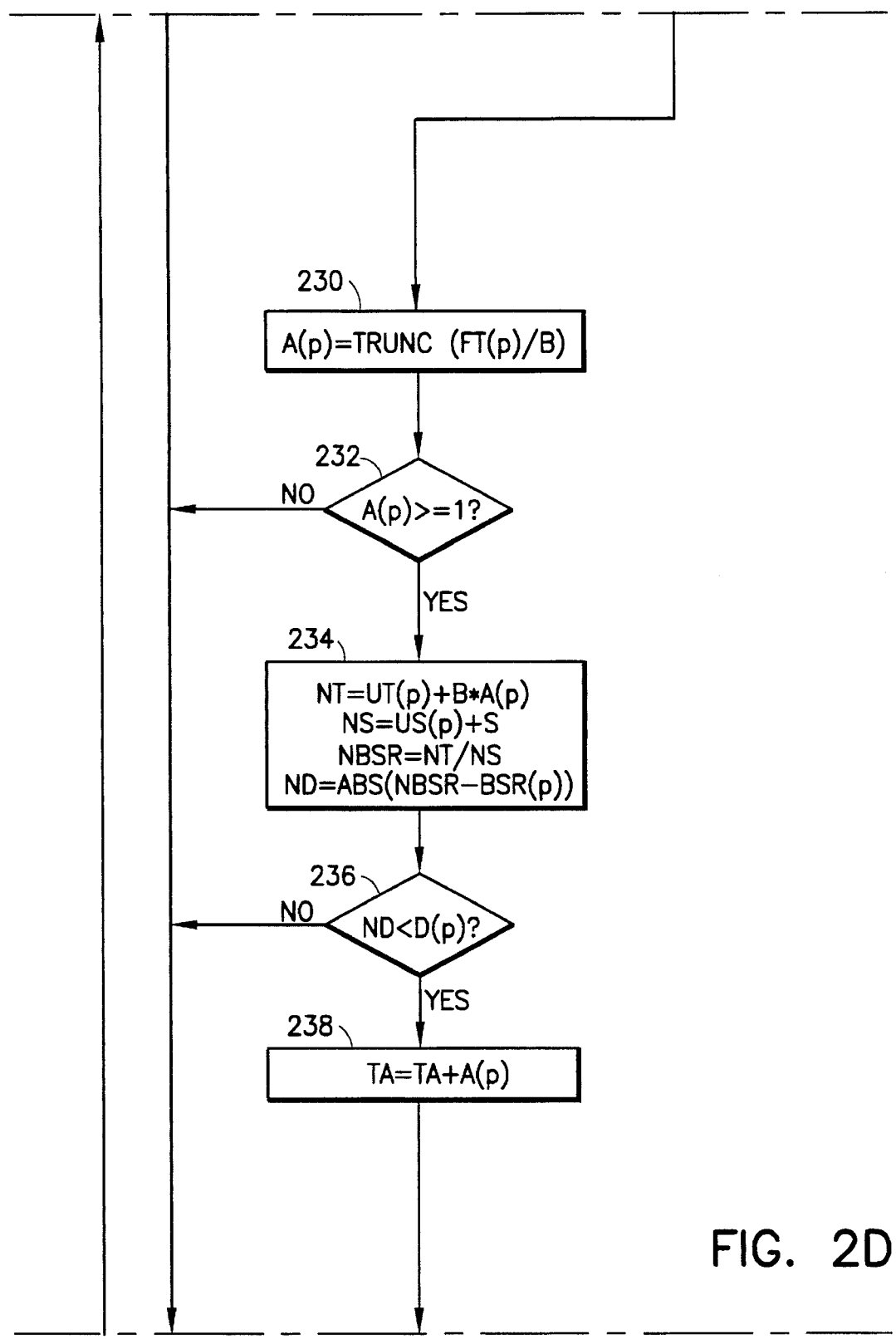
Figure 2E:
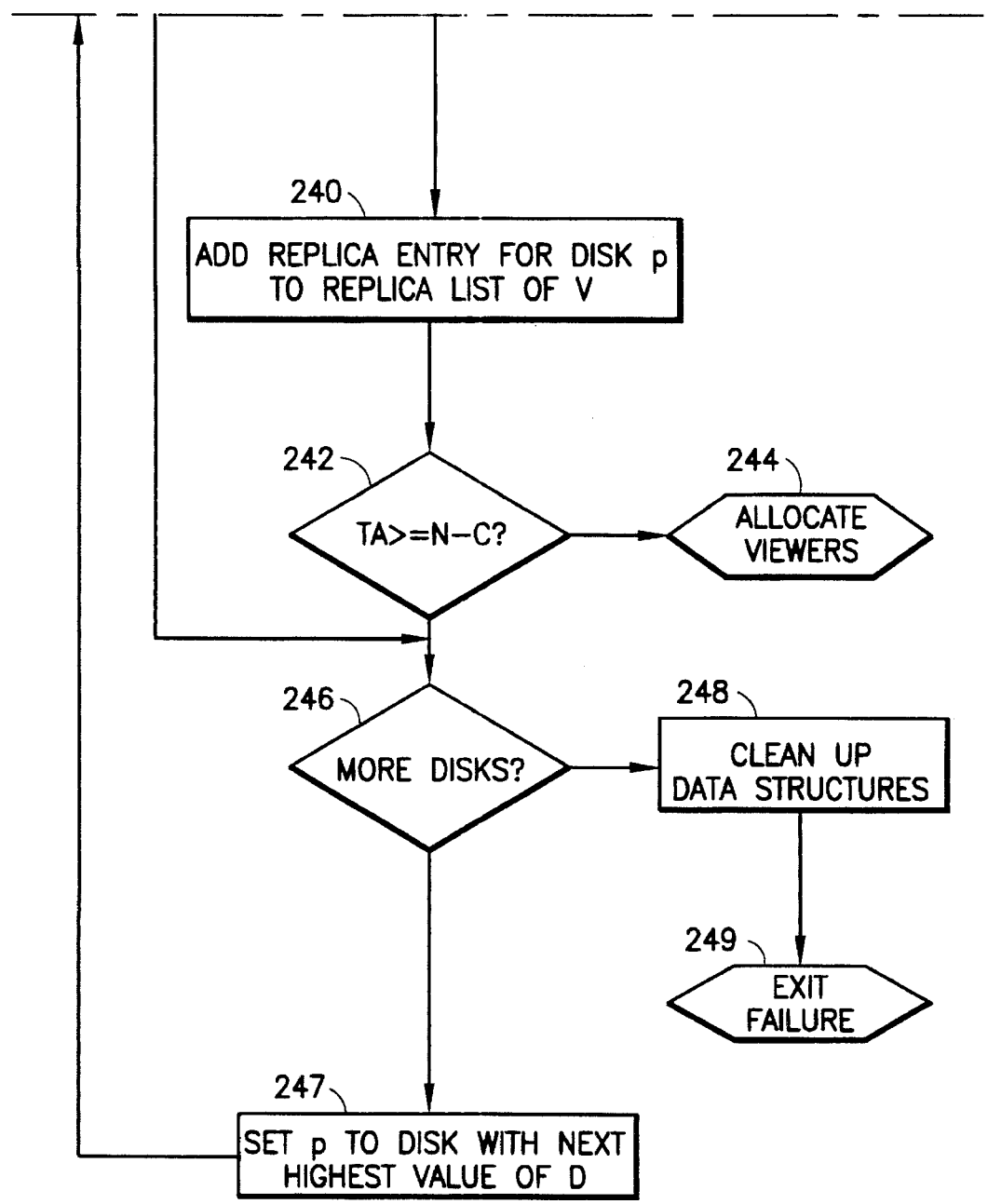
Figure 3B:
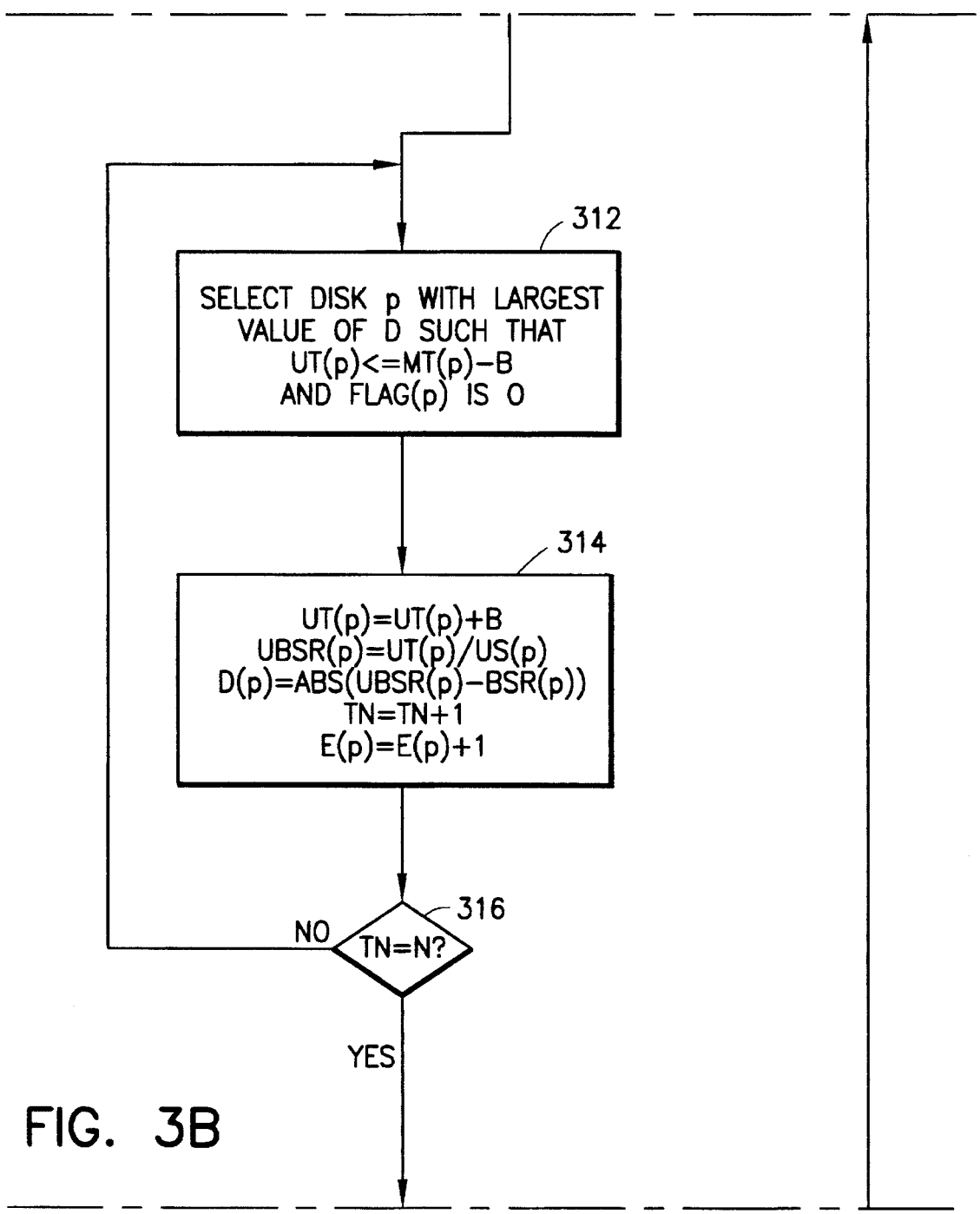
Figure 3C:
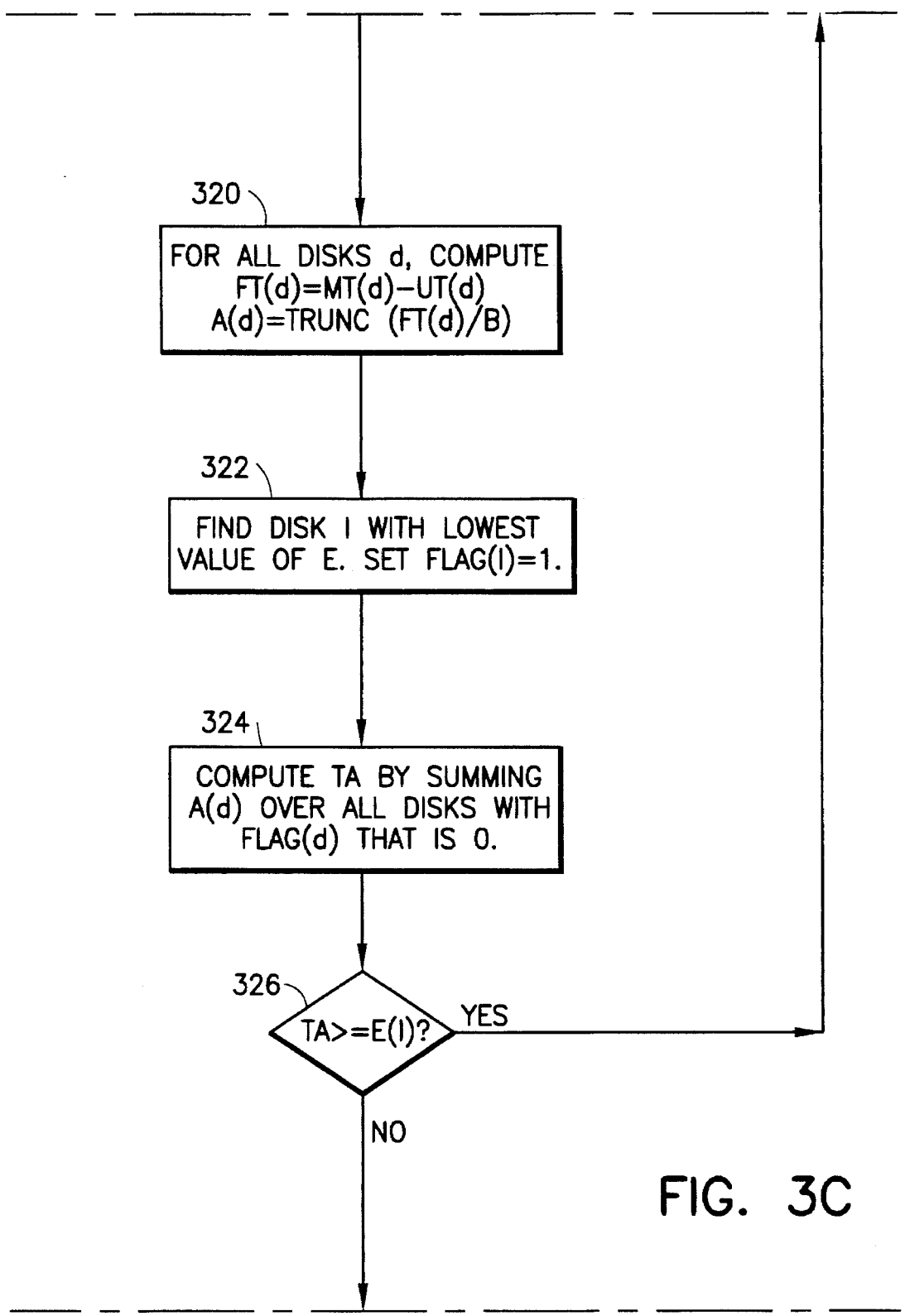
Figure 3D:
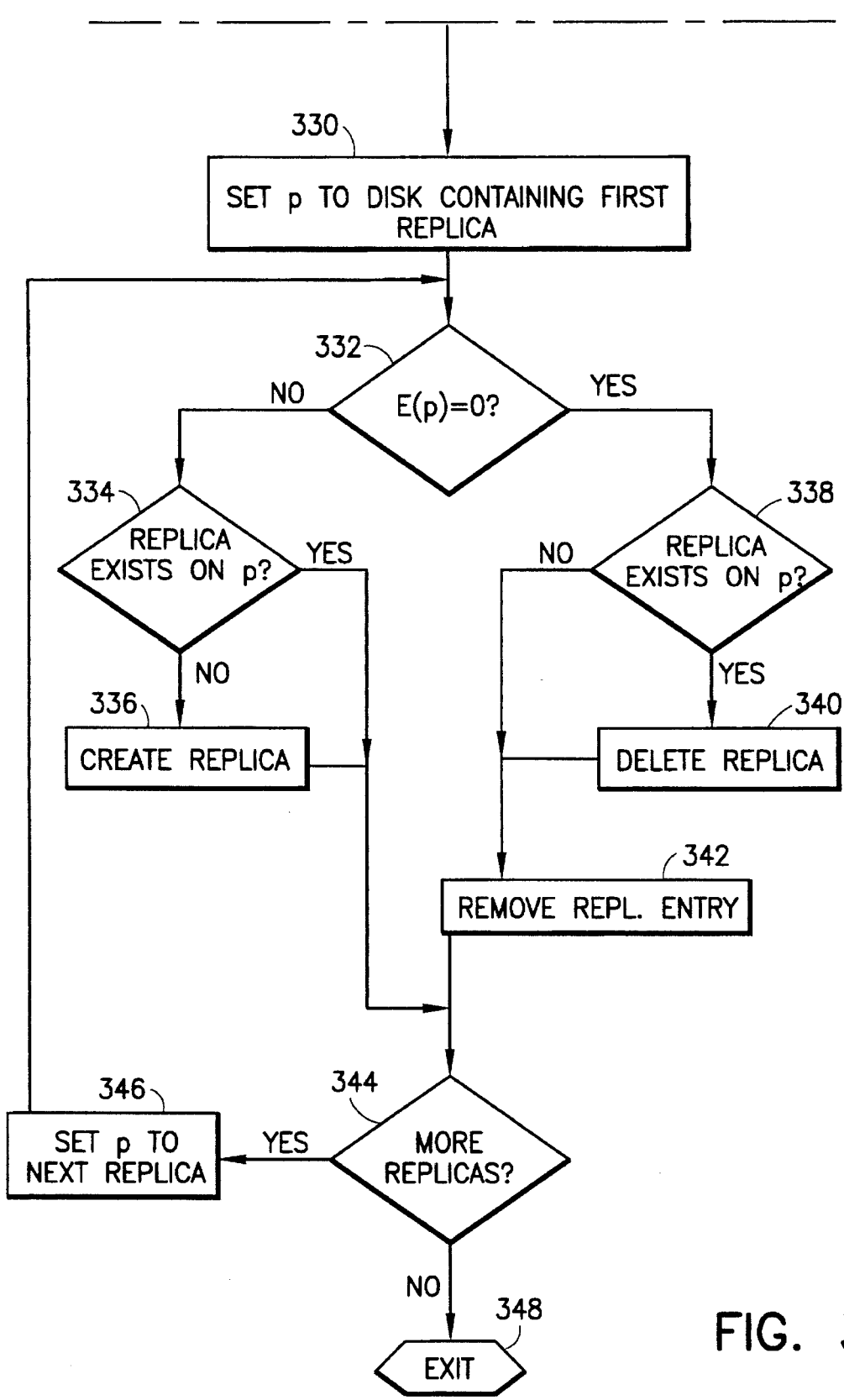

The data structures maintained by the video placement manager are shown in FIG. 1. A video table 100 contains one entry for each video in the system. Each video entry consists of the video identifier (video id) 101 (which identifies the title or reference number of the video), the bandwidth required to play the video 103 (this value can be the average bandwidth required to play the video, or, alternatively, a function of the maximum bandwidth required to play the video), the size of the video 104 and the replica list 105 which is a pointer to the list of replicas for the video.

There is a replica entry 110 for each replica of the video. The replica entry 110 includes the disk identifier (disk id) 111 of the disk the replica is on, the replica identifier (replica id) 112 which is the identifier (e.g. file name) of the replica and anticipated demand or the number of expected viewers 113 for this replica. Each replica entry also includes a next pointer 114 that points to the next entry in the list.

A disk table 120 contains an entry for each disk in the system. As previously described, each disk is actually a logical disk which may consist of a number of physical disks striped together. The disk entry consists of the disk identifier (disk id) 121 which identifies the disk, the maximum space 122 and free space 123 of the disk, together with the maximum throughput (bandwidth) 124 and the projected free throughput 125 of the disk. The projected free throughput 125 (also referred to as the free throughput 125) is the difference between the maximum throughput 124 and the projected throughput of the disk (i.e. the anticipated demand on the disk, not the current throughput or load on the disk). This field is updated by the video placement manager 408 whenever videos are added to the system.

The projected free throughput is computed by first estimating the projected throughput of each replica on the disk. The projected throughput of a replica is the product of the number of expected viewers 113 for the replica and the bandwidth 103 of the replica. The projected throughputs of the various replicas on the disk are summed to give the total projected throughput of the disk. This is subtracted from the maximum throughput 124 to yield the free throughput 125. Similarly, the free space 123 is equal to the maximum space 122 minus the space used by the videos on the disk. Initially when the disks are added to the system and contain no videos, the free space 123 is set to the maximum space 122 and the free throughput 125 is set to the maximum throughput 124. As various videos are added to the system the free space 123 is also updated by the video placement manager.

A flowchart of the processing of a command to configure the system to set the expected number of viewers for a video (V) to a new number of viewers (N) is shown in FIGS. 2A–2E. There are two phases to the process. In phase 1, as detailed in FIGS. 2A–2E, the VPM decides if additional replicas are needed. If so, the VPM selects the disks on which the additional replicas are to be created in phase I. The selection is made so as to minimize the deviation of the expected bandwidth-space ratio of the disk from the actual bandwidth-space ratio of the disk. In phase II (detailed in FIGS. 3A–3D), the expected viewers are allocated to the replicas and the number of replicas are consolidated.

Note that as the phases I and II are executed the data structures of FIG. 1 are modified accordingly to reflect any added or deleted replicas. Since the process will not always succeed (e.g. due to a lack of disk space), for ease of clean-up the VPM copies the pre-existing data structures to temporary data structures prior to execution of phases I and II. Upon failure of phases I or II, the VPM restores the data structures of FIG. 1 to their original state from the temporary copies. Upon successful completion of phases I and II, the VPM compares the original state of the data structures (from the temporary copies) with the current data structures to determine the replicas to be created, deleted or modified. Upon exiting, the VPM passes this information to the calling routine, which in turn, physically creates or deletes the replicas accordingly.

In step 202, the video placement manager locates the replica list 105 for video V and sums the expected viewers field 113 of all the replica entries 110. This yields the number of viewers for video V that the system is currently configured for (denoted by C). Then, in step 204, the VPM then determines if new number of viewers N is greater than the number of viewers for which the system is configured (is N>C?). If N is less than or equal to C, the reconfiguration request can be carried out simply by deleting replicas or adjusting the expected viewers field of the current replicas. Hence in step 206 the VPM starts executing the "Allocate Viewers" processing of FIGS. 3A–3D.

If N>C, in steps 208–210 the VPM computes the number of additional viewers (TA) that can be supported by the disks containing the current replicas. In step 208, the VPM computes the additional viewers (A) that each disk (d) can support by dividing the free throughput (FT) on each disk by the bandwidth (B) required by the video and truncating the result to the next lowest integer.

Next, in step 210 the total number of additional viewers (TA) which can be supported by the disks containing the replicas is determined by summing the additional viewers that each disk containing a replica can support. Then, in step 212 the VPM determines if TA is greater than or equal to the total number of additional viewers required (N - C). If it is, then the reconfiguration request can be satisfied simply by increasing the expected viewers field 113 of each replica without creating new replicas. Thus, in step 214 the VPM starts executing the "Allocate Viewers" process of FIGS. 3A–3D.

If TA<N-C, it is necessary to create new replicas. Thus, the VPM starts executing steps to select the disks on which the replicas are to be placed taking the BSR into account. In particular, in step 216 the projected throughput (UT) of each disk (d) is computed by subtracting the free throughput (FT) 125 for that disk from the maximum throughput (MT) 124 for that disk as found in the disk table 120. In step 218, the space on each disk (d) used by the videos is computed by subtracting the disk's free space (FS) 122 in the disk table 120 from the disk's maximum space (MS) 121.

In step 220, the VPM computes the BSR of the disk (BSR in the figure) from the maximum space 122 and maximum throughput 124 and the BSR of the videos on the disk (UBSR) from UT and US. The VPM then computes the deviation D of UBSR from BSR. In step 222, the disks are sorted in descending order of D. In step 224, the VPM starts scanning the disks in descending order of D, beginning with the disk with the highest value of D until sufficient disks are found using the criteria below.

In steps 224–247 the disk being scanned is referred to by the variable p. For each disk scanned, four tests are applied to see if a new replica of the video V should be created on p. In step 226 the first test checks to see if a disk p already has a replica of the video V. If the disk already has a replica of V, the VPM does not create another replica, but executes step 246 to scan the next disk.

If the disk does not already have a replica of V, in step 228 the second test compares the free space (FS) 123 in the disk table 120 to the size (S) 104 of the video in the video table 100 to see if there is enough free space to create a replica of the video. If not, in step 246 the VPM scans the next disk as before. If there is sufficient space, as described below in steps 230–232, the VPM determines if there is enough projected free throughput on the disk to support at least one viewer.

In step 230 the VPM computes the number of additional viewers A(p) of video V that disk p can support, by dividing the free throughput 125 of the disk by the bandwidth of the video V 103 and truncating the result to the next lowest integer. Then, in step 232, the VPM determines whether A(p) is greater than or equal to 1. If not, the VPM again rejects disk p and considers the next disk in step 246. If A(p) is greater than 1, in steps 234 and 236 the VPM determines whether the BSR deviation D(p) of the disks would be reduced by creating a new replica.

In step 234, the VPM computes the new BSR deviation (ND) of p from the new projected throughput (NT), new utilized space (NS) and new BSR (NBSR). In step 236, the new deviation ND is compared to the current BSR deviation D (p). If ND is greater than or equal to D(p), creating a replica would increase the BSR deviation, hence the VPM rejects this disk and goes to step 246. If ND<D(p), disk p is selected for storage of a replica.

In step 238, TA is increased by A(p) to reflect the fact that the current set of selected disks can support TA additional viewers and in step 240 a new replica entry 110 is created for the new replica. Then, in step 242 the VPM determines if TA is greater than or equal to N-C, the number of additional viewers required. If TA≧N-C, sufficient disks have been selected to support the required number of viewers, so the VPM starts executing the "Allocate Viewers" process of FIGS. 3A–3D in step 244.

If TA<N-C, it is necessary to select additional disks. Thus, in step 246, the VPM determines if there are any disks that have not yet been considered. If there are no such disks, it is not possible to satisfy the request. Hence in step 248, the VPM cleans up the data structures of FIG. 1 as described earlier and exits with a failure code returned to the administrator or monitor (whichever called the VPM). If the video server includes additional video storage disks that have not yet been considered, in step 247 the VPM selects the disk with the next highest value of D and repeats the four tests above starting from step 226.

FIGS. 3A–3D describe the processing performed after the VPM has selected the disks on which the replicas will be placed. After disk selection, the VPM decides how the expected viewers should be distributed among the replicas and consolidates the number of replicas.

The VPM carries out of steps 304–308 for each disk d on which a replica exists. In step 304, the VPM checks to see if a replica of V already exists on disk d. If there is no replica, in step 306 the VPM increments US(d) (the size of the used space on disk d) by the size (S) 104 of the video. In step 307, the VPM initializes a flag array (having one flag for each disk) to 0. The flag for a given disk p is referred to as Flag(p). In later steps of the process, a value of 1 for Flag(p) indicates that the VPM is attempting to consolidate the number of replicas by deleting the replica on disk p. The expected load of the replica on disk p has then to be shifted to other replicas.

In step 308, the BSR deviation D of the disks without any viewers from video V is computed. This is done by computing the utilized throughput (UT) of disk d without any viewers from video V, as well as computing UBSR the BSR based on UT and US. The expected viewers (E) 113 for disk d is also initialized to 0 since the VPM will reallocate the total viewers over all the disks. In addition, the temporary variable (TN) which indicates the number of viewers who have been allocated is initialized to 0.

Steps 312–316 constitute a loop in which viewers are allocated to the replicas so as to minimize the BSR deviation until all the viewers have been allocated. In step 312, the disk p with the largest BSR deviation D that has sufficient bandwidth to support another viewer (UT (p) ← MT (p) -B) and for which Flag (p) is 0 (indicating the VPM is not trying to delete the replica on this disk) is selected. The expected viewers E 113 for the disk p is incremented by 1 and UT(p), UBSR(p) and D(p) the BSR deviation for p are recomputed. The number of viewers that have been allocated TN is also incremented by 1. In step 316 the VPM checks to see if TN equals N. If it does not, TN-N viewers still have to be allocated to the disks, so the VPM re-executes step 312.

If TN equals N, the required number of viewers has been allocated. The VPM then executes steps 320–324 to consolidate the replicas by eliminating replicas. In step 320, the VPM computes for each disk d FT(d) the free throughput 125 of d and then A(d) the number of additional viewers that disk d can support. In step 322, the VPM finds the disk (1) with the lowest number of expected viewers 113 E(1) for video V. It then sets Flag(1) to 1 and in step 324 computes TA the total number of viewers that can be supported by the disks other than those with Flag set to 1. If TA≧E(1), in step 326 the replica on disk 1 can be eliminated and the viewers of the replica can be shifted to other disks. The VPM then executes step 308 which allocates the viewers to all the disks that have not been deleted.

If TA<E(1) in step 326, no more replicas can be deleted. In steps 330–348, the VPM executes the steps necessary to delete unneeded replicas. In step 330, the VPM examines the disk p containing the first replica in the replica list 105. If the expected viewers 113 of the disk E(p) is 0 in step 332, the VPM checks in step 338 if a replica of V already exists on disk p. If exists, it is deleted in step 340 and the free space 123 on disk p, FS(p), is adjusted. The replica entry 110 for the disk is deleted in step 342. Step 342 is also executed if no replica currently exists. After step 342, the VPM checks if there are more replicas in step 344. If there are, the VPM sets p to the next replica in step 346 and then loops back to step 332. If the expected viewers 113 of the disk E(p) is not 0, the VPM checks to see if a replica already exists in step 334. If a replica does not exist, the VPM creates a replica in step 336. The VPM then executes step 334.

If there are no more replicas in step 334, the VPM exits with success in step 348.

An alternative embodiment of the above-described system can be made by modifying step 322 which selects the replica with the lowest expected bandwidth demand for deletion. In accordance with the modification, after step 322 the VPM exits (completes phase II), if the replica with the lowest bandwidth demand is greater than a predetermined threshold (e.g. 25% of total expected demand for the video). Thus, in such instances the replica (and subsequent replicas having higher expected bandwidth) are not selected for deletion.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of balancing the placement of videos among multiple storage devices of a video server, comprising the steps of:
   (a) determining a bandwidth to space ratio (BSR) of each of the storage devices;
   (b) for each storage device, determining the ratio of the bandwidth expected to be required by the videos stored thereon during playout to the total storage space required by the videos stored thereon, and;
   (c) redistributing the videos on the storage devices so as to minimize for each storage device, the deviation between the BSR determined in step (a) and the ratio determined in step (b).

2. The method of claim 1 wherein the storage devices comprise logical disks.

3. A method of balancing the placement of movies among multiple storage devices of a video server, comprising the steps of:
   (a) determining a bandwidth to space ratio (BSR) of each of the storage devices;
   (b) for each storage device, determining the ratio of the bandwidth expected to be required by the movies stored thereon during playout to the total storage space required by the movies stored thereon, and;
   (c) redistributing the movies on the storage devices so as to minimize for each storage device, the deviation between the BSR determined in step (a) and the ratio determined in step (b).

4. The method of claim 1 wherein each video can have multiple replicas stored on different ones of the storage devices and wherein the redistribution comprises the steps:
   (d) determining whether the expected bandwidth of a replica is less than a predetermined threshold;
   (e) determining whether the expected bandwidth the replica can be redistributed among other replicas of the same video;
   (f) when conditions (d) and (e) are satisfied, deleting the replica and reassigning its expected bandwidth to the other replicas.

5. A method of balancing the placement of videos among multiple storage devices of a video server, comprising the steps of:
   (a) determining a bandwidth to space ratio (BSR) of each of the storage devices;
   (b) for each storage device, determining the ratio of the bandwidth expected to be required by the videos stored thereon during playout to the total storage space required by the videos stored thereon, and;
   (c) redistributing the videos on the storage devices so as to minimize for each storage device, the deviation between the BSR determined in step (a) and the ratio determined in step (b);
   wherein each video can have multiple replicas stored on different ones of the storage devices and wherein the redistributing comprises the step of creating and deleting replicas and assigning the expected bandwidth for each replica.

6. The method of claim 5 wherein the redistribution is invoked in response to a command from a system administrator and wherein only a single movie is redistributed per command.

7. The method of claim 5 wherein the redistributing comprises the steps of:
   determining whether reassigning expected bandwidth demand to existing replicas is sufficient to satisfy the expected demand for all the videos on the system;
   when the reassigning is not sufficient, selecting additional storage devices to hold new replicas and creating new replicas thereon and distributing the expected bandwidth demand among both pre-existing and new replicas.

8. The method of claim 7, comprising the further step of determining a current bandwidth demand for each of the storage devices and only attempting to create a new replica on storage devices that have sufficient current bandwidth to accomplish the creation.

9. A video placement system for use in a video server of a type having a plurality of videos among multiple logical disks, comprising:
   (a) means for receiving a command from a system administrator; and,
   (b) means, responsive to the command for:
      (i) determining a bandwidth to space ratio (BSR) of each of the logical disks;
      (ii) for each logical disk, determining the ratio of the bandwidth expected to be required by the videos stored thereon during playout to the total storage space required by the videos stored thereon, and;
      (iii) means for redistributing the videos on the logical disks so as to minimize for each logical disk, the deviation between the BSR determined in step (a) and the ratio determined in step (b).

10. A method of balancing the placement of motion video data among multiple storage devices of a video server, comprising the steps of:
    (a) determining a bandwidth to space ratio (BSR) of each of the storage devices;
    (b) for each storage device, determining the ratio of the bandwidth expected to be required by the motion video data stored thereon during playout to the total storage space required by the motion video data stored thereon, and;
    (c) redistributing the motion video data on the storage devices so as to minimize for each storage device, the deviation between the BSR determined in step (a) and the ratio determined in step (b).

* * * * *